April 28, 1959 L. HUNAU Re. 24,640

FOUNDATION GARMENT

Original Filed Sept. 13, 1957

INVENTOR.

BY Lillian Hunau

ATTORNEY

Howard E. Rockenbach

United States Patent Office

Re. 24,640
Reissued Apr. 28, 1959

24,640

FOUNDATION GARMENT

Lillian Hunau, Great Neck, N.Y., assignor to Exquisite Form Brassiere Inc., New York, N.Y., a corporation of New York Original No. 2,853,077, dated September 23, 1958, Serial No. 683,839, September 13, 1957. Application for reissue November 17, 1958, Serial No. 774,569

7 Claims. (Cl. 128—493)

Matter enclosed in heavy brackets [ ] appears in the original patent but forms no part of this reissue specification; matter printed in italics indicates the additions made by reissue.

This invention relates to clothing, and particularly to ladies' foundation garments of the type known as brassieres.

Known constructions of mass produced brassieres are supplied to wearers thereof in a number of fixed sizes. Different sizes, of course, allow for dimensional variation from wearer to wearer. In addition, there are to be found on the market, many different styles of brassieres to achieve different bust molding effects, or for use with different types of outer garb, for example, dresses with varying depths of neckline. But with brassieres of conventional construction, the wearer has no opportunity in the same brassiere to cause variations in the molded appearance of the bust, although such variations may be desirable with different dress styles, and at different seasons, nor will the same conventional brassiere often be suitable for use with different depths of neckline.

Accordingly, it is the primary object in the present invention to provide a brassiere which permits variation in the molded appearance of the bust, and also permits adaptation of the same brassiere for use with shallower or deeper necklines. The way in which this primary object is accomplished is to permit, by a single, very simple manipulation, an alteration in the effective surface area of fabric in both the bust cups, whereby a redistribution of the stress bearing function of different areas of the bust cups occurs. Thus, it is possible by the indicated manipulation to obtain a more accentuated contour where this is indicated as desirable for a certain dress, or to permit a more relaxed contour, as may be desired for another garment. It is not necessary in the carrying out of this object that any portion be removed from the brassiere, nor need anything be added thereto, nor is it necessary to employ any agency outside my novel brassiere itself to reach the objective prescribed.

Another object in the present invention is to utilize, in achieving the indicated primary objective, material and fabrics commonly employed in brassiere construction so that impracticality in manufacture by reason of excessive costs of materials is avoided. Furthermore, conventional equipment employed in brassiere manufacture may be utilized in the production of my novel brassiere, so that no modification in equipment is necessary, and added expense on this account will be likewise avoided.

A final object is to provide a brassiere of novel construction for novel application, which is nonetheless as satisfactory as conventional brassieres from the point of view of the wearer so far as maintenance is concerned, in that no difficulty in laundering arises.

How these and many other objects are to be achieved will become clear through a consideration of the accompanying drawings wherein.

Figure 1:
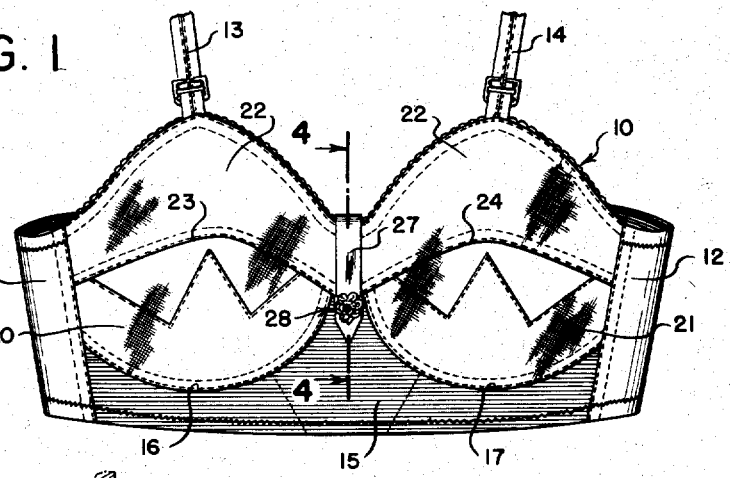
Fig. 1 is a front elevational view of an embodiment of my novel brassiere with the loop of the strap extended.

In the drawings is shown a brassiere having a bust covering section, generally designated 10, and body encircling members 11 and 12 extending from either side of the bust covering section 10. Shoulder straps 13 and 14 are attached to the bust covering section.

Figure 2:
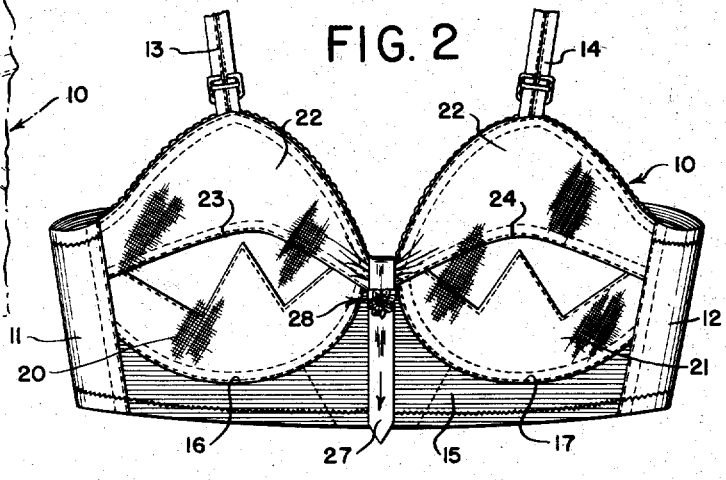
Fig. 2 is an elevational view similar to Fig. 1 with the loop of the strap contracted by reason of having been drawn through the buckle.

Within the bust covering section 10, is a base member 11 which may be of horizontally stretchable fabric as shown in the drawings, such base member 10 defining the bottom of the brassiere in the bust covering section thereof. The upper edge of the base member 15 presents two arcuate edges 16 and 17 into which lower parts 20 and 21 of a pair of bust cups are set as shown in Figs. 1 and 2. An upper portion 22 of bust covering section 10, extends across such bust covering section, providing upper parts in each of the bust cups. Such upper portion 22 is joined to the lower part 20 in the left cup seen in the drawings along a substantially medial line 23, and to lower part 21 of the right bust cup along medial line 24, such medial lines 23 and 24 presenting a substantially single medial line extending across the entire bust covering section.

Figure 3:
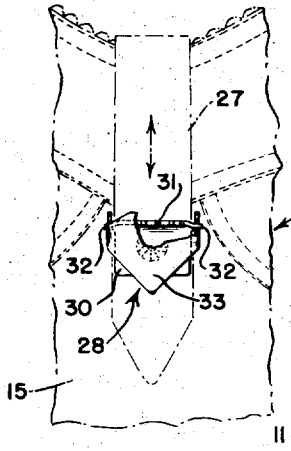
Fig. 3 is a schematic enlarged representation indicating the interaction between the strap and the buckle.

A strap 27 is secured to the interior surface of base member 15, between the bust cups, such strap 27 being secured to the base member 15 at only one of its ends, the other end being free, and passing through buckle 28 which is mounted on the exterior surface of base member 15. As may be seen in Fig. 4, stitches 29 passing through the base member 15 serve to hold both the mounted end of strap 27 and buckle 28 upon the base member 15. The buckle comprises a frame 30 which is the part of the buckle held to base member 15 by stitches 29, and such frame member has an upstanding serrated edge 31. Lugs 32 extend from the frame 30 on either side, and engage lever portion 33 of the buckle for pivotal movement of the lever portion. When the lever portion 33 is in its down position as exemplified in Fig. 4, the portion of the strap 27 passing therethrough is securely held and locked against the serrated edge 31 by the lever portion 33. When, however, lever portion 33 is pivoted outwardly as indicated by the arrows in Fig. 4, the strap is released and may be pulled in either direction as indicated by arrows in Figs. 3 and 4 through the buckle to a desired position, whereupon the strap may be locked at such position by returning the lever portion 33 to the down position.

Figure 4:
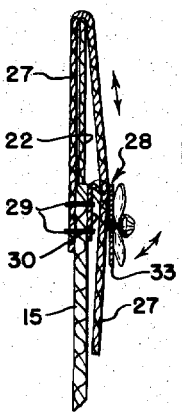
Fig. 4 is a section at 4—4 of Fig. 1.

Strap 27 provides a loop, as best seen in Fig. 4, between its mounted end and its end which passes through the buckle 28, and such loop passes around the center of upper portion 22 of the bust covering section. Fig. 1 illustrates the condition of the brassiere when the loop provided by strap 27 is extended so that upper portion 22 is unaffected. The condition of the brassiere seen in Fig. 2 may be attained by pivoting lever portion 33 of the buckle 28 outwardly to release the strap 27 and permit slidable movement of the strap through the buckle. The strap is then pulled downwardly whereby the loop of the strap is contracted which means that the portion of the upper portion of the bust covering section within such loop is gathered. The direction of movement of the strap necessary to achieve this end is indicated by the arrow in Fig. 2. After the upper portion is gathered to the extent desired, lever portion 33 of the buckle is pivoted downwardly to lock and hold the strap in such position. By the manipulation of the strap as indicated, the molding characteristics of the respective bust cups will be markedly changed, and the net effect will be an accentuation of the bust of the wearer.

While I have described a specific embodiment of my invention, it is apparent that changes and modifications may be made therein without departing from the spirit of my invention.

I claim:

1. A brassiere comprising a bust covering section and body encircling members extending from said bust covering section, a strap fixedly mounted at one end thereof on a first face of said bust covering section, the other end of said strap being free, a buckle mounted on the second face of said bust covering section, the free end of said strap being releasably and slidably engageable by said buckle, said bust covering section having an upper portion, said strap forming a loop within which said upper portion is included, whereby upon reduction in size of said loop by drawing said strap through said buckle, said upper portion of said bust covering section will be gathered within said loop.

2. A brassiere comprising a bust covering section and body encircling members extending from said bust covering section, a strap fixedly mounted at one end thereof on the interior of said bust covering section, the other end of said strap being free, a buckle mounted on the exterior of said bust covering section, the free end of said strap being releasably and slidably engageable by said buckle, said bust covering section having an upper portion, said strap forming a loop within which said upper portion is included, whereby upon reduction in size of said loop by drawing said strap through said buckle, said upper portion of said bust covering section will be gathered within said loop.

3. A brassiere comprising a bust covering section and body encircling members extending from said bust covering section, an elongated element fixedly mounted at one end thereof on a first face of said bust covering section, the other end of said element being free, a fastening element mounted on the second face of said bust covering section, the free end of said elongated element being engageable by said fastening element for securement therewith, said bust covering section having an upper portion, said elongated element forming a loop within which said upper portion is included, whereby upon reduction in size of said loop by engaging said elongated element with said fastening element, said upper portion of said bust covering section will be gathered within said loop.

4. A brassiere comprising a bust covering section and body encircling members extending from said bust covering section, said bust covering section including a pair of spaced breast receiving pockets, an elongated element fixedly mounted at one end thereof on a face of said bust covering section between said pockets, the other end of said element being free, a fastening element mounted on a face of said bust covering section between said pockets and spaced a substantial distance from the fixed end of said elongated element, the free portion of said elongated element being engageable by said fastening element for securement therewith, said bust covering section having an upper portion, said elongated element forming a loop within which said upper portion is included, whereby upon reduction in size of said loop by engaging said elongated element with said fastening element, said upper portion of said bust covering section will be gathered within said loop.

*5. A brassiere comprising a bust covering section and body encircling members extending from said bust covering section, a strap fixedly mounted at one end thereof on a first face of said bust covering section, a buckle mounted on the second face of said bust covering section, said strap being releasably and slidably engageable by said buckle, said bust covering section having an upper portion, whereby upon securement of said strap with said buckle said upper portion of said bust covering section will be gathered together.*

*6. A brassiere comprising a bust covering section and body encircling members extending from said bust covering section, said bust covering section including a pair of spaced breast receiving pockets, an elongated element fixedly mounted at one end thereof on the face of said bust covering section between said pockets, a fastening element mounted on a face of said bust covering section between said pockets and spaced a substantial distance from the fixed end of said elongated element, said elongated element being engageable by said fastening element for securement therewith, said bust covering section having an upper portion whereby upon securement of the said elongated element with said fastening element said upper portion of said bust covering section will be gathered together.*

*7. A brassiere comprising a bust covering section and body encircling members extending from said bust covering section, said bust covering section including a pair of spaced breast receiving pockets, an elongated element fixedly mounted at one end thereof on a first face of said bust covering section between said pockets, a fastening element mounted on the second face of said bust covering section between said pockets, said elongated element being releasably and slidably engageable by said fastening element, said bust covering section having an upper portion, whereby upon securement of said elongated element with said fastening element said upper portion of said bust covering section will be gathered together.*

References Cited in the file of this patent or the original patent

UNITED STATES PATENTS

| | | |
|---|---|---|
| 1,210,863 | Sobra | Jan. 2, 1907 |
| 2,108,461 | Williams | Feb. 15, 1938 |
| 2,180,180 | Versoy | Nov. 14, 1939 |
| 2,313,811 | Dubner | Mar. 16, 1943 |
| 2,346,411 | Becker et al. | Apr. 11, 1944 |
| 2,407,574 | Panes | Sept. 10, 1946 |
| 2,430,877 | Kay | Nov. 18, 1947 |
| 2,867,216 | Champagne et al. | Jan. 6, 1959 |
| 2,869,552 | Smith | Jan. 20, 1959 |

FOREIGN PATENTS

| | | |
|---|---|---|
| 460,261 | Germany | May 25, 1928 |